United States Patent
Peng et al.

(10) Patent No.: US 10,725,925 B2
(45) Date of Patent: Jul. 28, 2020

(54) METADATA-SPECIFIC CACHE POLICY FOR DEVICE RELIABILITY

(71) Applicant: Seagate Technology LLC, Cupertino, CA (US)

(72) Inventors: Chee Hou Peng, Singapore (SG); Mun Kai Lye, Singapore (SG); WenXiang Xie, Singapore (SG); Vincent Uy, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 105 days.

(21) Appl. No.: 16/130,082

(22) Filed: Sep. 13, 2018

(65) Prior Publication Data

US 2020/0089614 A1    Mar. 19, 2020

(51) Int. Cl.
*G06F 12/0891* (2016.01)
*G06F 12/0868* (2016.01)
*G06F 12/0888* (2016.01)

(52) U.S. Cl.
CPC ...... *G06F 12/0891* (2013.01); *G06F 12/0868* (2013.01); *G06F 12/0888* (2013.01)

(58) Field of Classification Search
None
See application file for complete search history.

(56) References Cited

U.S. PATENT DOCUMENTS

| | | |
|---|---|---|
| 10,061,655 B2 | 8/2018 | Nemawarkar et al. |
| 2012/0151253 A1* | 6/2012 | Horn ................... G06F 12/0804 714/6.22 |
| 2012/0239860 A1* | 9/2012 | Atkisson ............. G06F 12/0246 711/103 |
| 2012/0290786 A1 | 11/2012 | Mesnier |
| 2017/0060668 A1* | 3/2017 | Farhan .................. G06F 11/073 |
| 2017/0329707 A1 | 11/2017 | Nemawarkar et al. |

\* cited by examiner

*Primary Examiner* — Denise Tran
(74) *Attorney, Agent, or Firm* — Holzer Patel Drennan

(57) ABSTRACT

A method writing data received from a host device includes determining whether command data of a write command includes metadata, flushing the command data out of a volatile write cache according to a first caching policy responsive to a determination that the command data does includes metadata, and flushing the command data out of the volatile write cache according to a second different caching policy responsive to a determination that the command data does not include metadata.

20 Claims, 6 Drawing Sheets

METADATA-SPECIFIC CACHE POLICY FOR DEVICE RELIABILITY

BACKGROUND

In some applications, storage devices receive and store multi-channel data streams that include sequentially intermixed packets of data of different data channels. For example, a digital video recorder (DVR) may be programmed to receive a data stream that includes packets of data for multiple different channels (e.g., TV channels). In hard drive devices with moving parts, performance may be negatively impacted when host data is written according to a strict sequential order of receipt, as this may entail excessive seeks of an actuator arm to disparate storage media locations. For this reason, some storage devices implement caching policies that cause the storage device to coalesce together data of different write commands within a cache before moving the data to permanent storage locations. These caching policies may increase the number of forward-sequential writes and decrease the total time that the storage device spends writing data.

Despite the above-mentioned benefits of efficient cache utilization, caching large amounts of data increases the risk of crucial metadata loss in the event of unexpected power failure. In some systems, the host uses metadata to determine where to write new data. For example, the host may rely on metadata to identify storage locations of previously-written data when recording segments of a data stream, such as a video or audio channel stream. When recently-updated metadata is wiped from volatile memory before being copied to a non-volatile storage location, the host may—upon reboot—be unable to reconstruct recent storage locations and "hang" as a result of its inability to select a storage location for newly-received segments of the data stream.

BRIEF DESCRIPTIONS OF THE DRAWINGS

SUMMARY

A method for protecting metadata against power-related data loss includes writing command data to a volatile cache responsive to receipt of a write command and evaluating the write command to determine whether the command data includes metadata. The method further includes flushing the command data out of the volatile write cache according to a first caching policy responsive to a determination that the command data includes metadata and flushing the command data out of the volatile write cache according to a second different caching policy responsive to a determination that the command data does not include metadata. According to one implementation, the first caching policy prioritizes flushing the command data out of the write cache at an earlier time than the second caching policy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
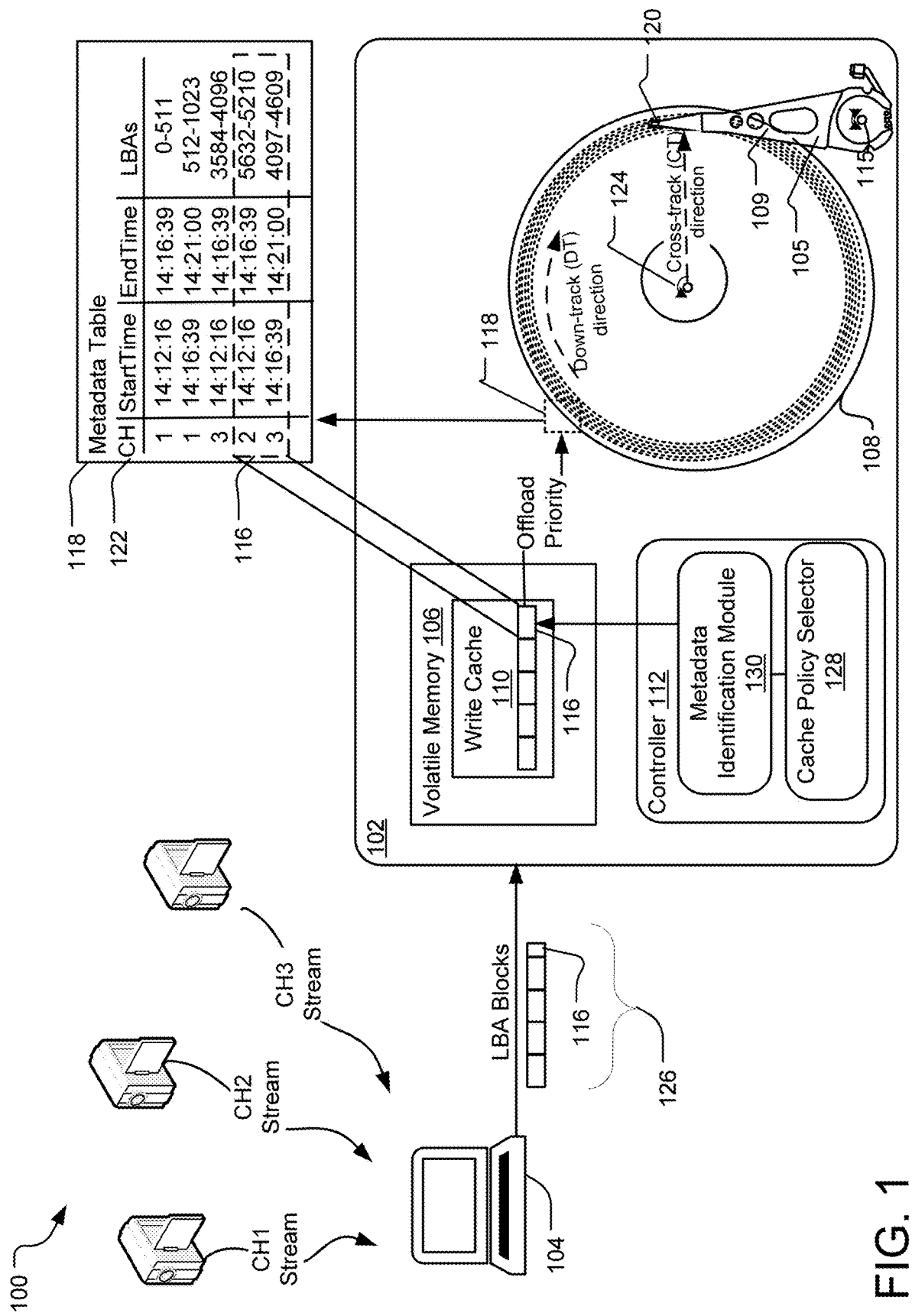
FIG. 1 illustrates an example storage system that implements a metadata-specific caching policy to mitigate risk of metadata loss without compromising write throughput gains.

FIG. 1 illustrates an example storage system 100 that implements a metadata-specific caching policy to mitigate risk of critical data loss without compromising write throughput gains that can be realized by caching larger quantities of data during nominal storage device operations. The storage system 100 includes a storage device 102 including a storage medium 108 and a controller 112. The controller 112 of the storage device 102 includes software and/or hardware for executing data access commands from a host device 104 by writing data to and reading data from targeted locations on the storage medium 108.

In the illustrated example, the host device 104 is shown actively receiving digital video data from multiple channels (e.g., CH1, CH2, CH3), which are shown to stream from three different video streams. In another implementation, the channel streams CH1 CH2, and CH3 represent different TV channels that the host receives either as different streams or as part of single multi-channel stream including intermixed segments of different data channels. In one implementation, the storage device 102 is included within a digital video recorder (DVR) or set-top box designed to record live broadcasts of multiple channels and/or save on-demand content for subsequent viewing by a user.

As used herein, a "channel" or a "channel stream" refers to an individual, continuous stream of data from a same data source. In the case of digital content channels, a continuous portion of an individual channel can be viewed and/or listened to when the channel data is read back from the storage medium 108 according to a defined order (e.g., a sequential order of receipt). A digital content item is, for example, a data stream including video and/or audio data, such as a movie, TV show, commercial, audio clip, etc.

The host device 104 selects logical block addresses (LBAs) for the incoming channel data and transmits a series of write commands that instruct the storage device 102 to record the channel data. Each write command indicates a selected logical address for writing command data (e.g., LBA blocks 126) that is transmitted along with the write command. In the following description, the term "command data" is used to refer to the data that is written via execution of a write command. In contrast, "write command" is used to refer the command itself and any parameters transferred to the storage device 102 in association with the command, such as the target LBAs.

To facilitate execution of read and write commands, the controller 112 manages a mapping of the host LBAs to corresponding physical data blocks (PBAs) on the storage medium 108. The range of physical data blocks included within the LBA mapping scheme is referred to herein as a "main store." In one implementation, the entire main store (e.g., full range of host LBAs) is mapped to the storage medium 108.

Although other implementations are contemplated, the storage medium 108 of FIG. 1 is a magnetic disk on which data bits can be recorded using a magnetic write pole and from which data bits can be read using a magneto resistive element (not shown). In other implementations, the storage medium 108 is not a magnetic disk but instead, another type of tangible non-volatile memory, such as solid state storage (e.g., Flash). The storage medium 108 rotates about a spindle center or a disc axis of rotation 124 during rotation and includes an inner diameter and an outer diameter between which are a number of concentric data tracks. Information may be written to and read from data bit locations in the data tracks using read/write element(s) on a transducer head assembly 120, which is further mounted on an actuator assembly 105 at an end distal to an actuator axis of rotation 115. The transducer head assembly 120 flies in close proximity to the surface of the storage medium 108 while the storage medium 108 rotates about the axis of rotation 124. When reading data from or writing data to various locations on the storage medium 108, the actuator assembly 105 rotates about the actuator axis of rotation 115 to position the transducer head assembly 120 over a target data track.

In one implementation, the host device 104 implements logic to map continuous channel segments within each individual channel of the multi-channel data stream 114 to consecutively-accessible LBAs (e.g., consecutive LBAs mapped to consecutive physical data blocks). In the following disclosure, two channel segments of a same channel are referred to as "continuous channel segments" if one of the channel segments appends to data of the other channel segment, such as when the two segments are intended to be read and/or played consecutively when data is read back from the storage device 102. If the channel segments include video data, data spanning two continuous channel segments can be played back to view a continuous video segment of a digital content item. Similarly, a first channel segment is said to be a continuation of a second channel segment, such as a previously-received and/or recorded channel segment, if the second channel segment appends the data of the first channel segment, such as when the two channel segments include data of a same channel and/or a same digital content item and are intended to be read and played consecutively.

As each packet of the various channel streams (CH1, CH2, CH3) arrives at the host device 104, the host device 104 updates a metadata table 118 to include information about that packet. In general, metadata refers to data that describes other data. For example, metadata may include data that describes where a data file is stored, when the data was created, who created the data, who last modified the data, etc. In FIG. 1, the metadata table 118 may be understood as the file system that the host later uses to determine which LBAs in the logical address space correspond to which data files. In some implementations, the host device 104 maintains a single metadata table 118. In other implementations, the host device 104 maintains multiple metadata tables, such as a different table for each one of the different received channel streams.

Although the metadata table 118 may store a variety of different types of information in different implementations, the metadata table 118 is shown to include a channel identifier (ID) 122 indicating the channel to which the data segment belongs to (e.g., CH1, CH2, CH3) as well as timestamp information including a start time and a stop time in association with each received data segment.

In addition to the determined channel ID 122, start time, and stop time associated with each received channel segment, the metadata table 118 also includes the LBA range that the host device 104 has assigned to the received channel segment. When the host device 104 receives each new channel segment and identifies the associated channel ID 122, the host device 104 then references the metadata table 118 and determines if that segment is a continuation of an already-written channel segment. If, for example, the host device 104 receives a CH1 segment with a start time of 14:21:01, the host device 104 may reference the metadata table 118 and determine that the new segment is a continuation of another CH1 segment that has already been received and assigned to LBAs 512-1023. In this case, the host device 104 may select the next available sequential LBA (e.g., 1024) as a start address for the new CH1 segment. In this manner, the write history contained in the metadata table 118 allows the host device 104 to select LBA locations for each block of incoming data.

In one implementation, the metadata table 118 is stored in a permanent location in the main store on the storage medium 108. For quick access, the metadata table 118 is loaded into volatile memory 106 of the storage device 102 during a power-on sequence. As the host device 104 updates the metadata table 118 during routine storage operations, the host device 104 transmits metadata updates to the storage device 102 along with the other LBA data blocks 126 that include the channel segments from the various streams (CH1, CH2, CH3). For example, FIG. 1 illustrates a metadata update 116 that is included in the transmitted LBA blocks 126. The metadata update 116 includes metadata for two channel segments (e.g., the final two rows illustrated within the metadata table 118).

As the transmitted LBA blocks 126 from the host device 104 arrive at the storage device 102, the controller 112 places the transmitted LBA blocks 126 in a write cache 110 of the volatile memory 106. Periodically, data in the write cache 110 is flushed (migrated) to the corresponding LBA locations on the storage medium 108. If power is lost unexpectedly, the volatile memory 106 is erased. Therefore, one risk of using the volatile memory 106 for cache storage is that metadata, such as the metadata update 116 may be lost if there is a power failure before the controller 112 flushes the corresponding data to the its permanent location. If this occurs, an outdated version of the metadata table 118 may be loaded into the volatile memory 106 when the storage device 102 re-boots following the power failure. Since this re-loaded, outdated version of the metadata table 118 does not include the metadata update 116, the host device 104 may "hang" during the next data write since the host is unable to determine location(s) of the recently-written data and, consequently, unable to select LBAs for new incoming channel segments. For this reason, it is important that updated metadata segments be flushed from the write cache 110 as quickly.

In traditional storage systems, a storage controller has no way to distinguish metadata from other types of data that is placed in the write cache 110. For this reason, some storage devices implement quick-flush policies that limit how long data remain in a volatile write cache. These policies ultimately reduce write throughput by increasing a total number of non-sequential writes to the storage media 108 as compared to systems that more utilize the write cache 110 to hold and coalesce larger amounts of data.

To improve upon the above-described system shortcomings, the storage device 102 includes modules that implement selective caching policies to allow crucial metadata to be identified and quickly flushed from the write cache 110 without subjecting other data (e.g., video data from the channel streams) to the same quick-flush policy.

In FIG. 1, the controller 112 includes a metadata identification module 130 and a cache policy selector 128. Each of the metadata identification module 130 and the cache policy selector are stored in memory and locally-executable by a processor (not shown) of the storage device 102. The metadata identification module 130 assesses command data of each incoming write command to determine, based on pre-established rules, whether the command data (e.g., the data written by execution of the command) includes metadata.

When the metadata identification module 130 determines that the command data includes metadata, the cache policy selector 128 elects to implement a metadata-specific caching policy. For example, the metadata-specific caching policy may prioritize a flush of the command data, such as by scheduling (queuing) a flush command that, when executed, migrates the command data from the write cache 110 to permanent main store locations on the storage medium 108. In one implementation, the metadata-specific caching policy prioritizes a flush of identified metadata while allowing other, already-cached command data (e.g., cached video segments) to remain within the write cache 110 and be flushed according to a different policy.

When the metadata identification module 130 determines that the write command data does not include metadata, the cache policy selector 128 elects to implement a different (e.g., default) caching policy. For example, the default policy may provide for retention of the data segment in the cache for a set amount of time and/or until the segment can be coalesced with other LBA-consecutive data within the write cache 110.

Figure 2:
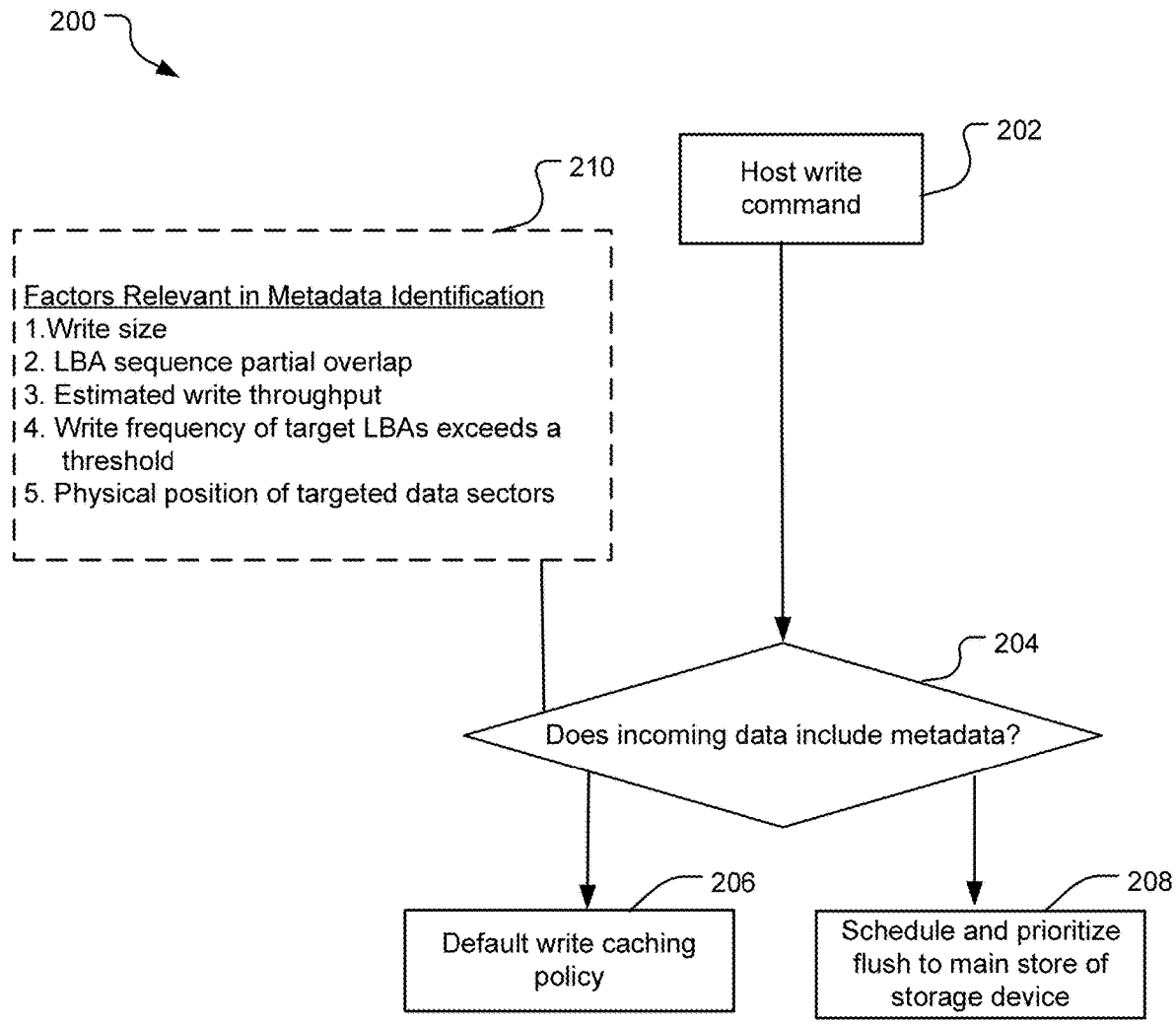
FIG. 2 illustrates example operations of a storage device controller implementing selective caching policies when writing data.

FIG. 2 illustrates example operations 200 of a storage device controller implementing selective caching policies to when writing data from a host device. During nominal storage device operations, the host device transmits write commands (e.g., a host write command 202), and the storage device controller assesses each received write command to determine, via a determination operation 204, whether incoming data specified by the write command includes metadata.

A list of metadata identification factors 210 represents an exemplary, non-exclusive list of factor that my, in some circumstances, be usable to distinguishing host metadata writes from other data writes. In one implementation, the storage device controller determines whether command data is metadata by evaluating an individual write command in view of one or more predefined rules based on one or more of the metadata identification factors 210.

The first exemplary factor in the example list of metadata identification factors 210 is "write size," also referred to herein as "write data size," which generally refers to the size of data written via execution of particular write operation. In some implementations, metadata updates are received as separate write commands from those associated with writes of channel data (e.g., video stream data). In these cases, the write size of a command may serve to indicate whether the command data is likely to be metadata. In one implementation, a write size of a command writing metadata has an average write size that is much smaller than an average write size of other types of data. For example, a metadata update may be less than about 64 KB while writes of video data may have a minimum size that is at or around 64 KB and greater.

Another factor included within the exemplary listing of metadata identification factors 210 is "LBA sequence partial overlap," which generally refers to an overlap between a target LBA range of a write command and a recently-written LBA sequence. Since a metadata update may append to or alter data previously written (e.g., to a metadata table), a metadata update may sometimes be directed to a LBA sequence that partially overlaps with a recently-written LBA sequence.

"Estimated write throughput" is another one of the exemplary metadata identification factors 210 that may, in some implementations, be usable to distinguish metadata from other types of data. In systems that record multiple incoming channel streams (e.g., as in FIG. 1), write throughput may be characteristically higher for commands that write metadata as compared to commands that write other types of data. In one implementation, metadata is stored in a different disk location that radially separated from a region used to store incoming channel data. For this reason, a metadata update command interspersed within other write commands may be associated with a higher seek time (e.g., higher write throughput for command execution) than the other commands in sequence.

Still another factor included within the exemplary listing of metadata identification factors 210 is the write frequency of targeted LBAs. If the storage device determines that a targeted LBA range has been updated with some frequency (e.g., a set number of time within a recent time interval, such as five minutes), this may indicate an increased probability that the LBA range includes metadata.

Another factor that may be used to identify metadata is the physical position of targeted data blocks. In a variety of magnetic recording systems, operating system data and other important files are stored at extreme inner diameter or outer diameter disk positions. This is, for example, because data at the outer diameter is associated with a shortest access time and data transfer rate. For similar reasons, the host may be programmed to store metadata at extreme inner and outer diameter positions of the disk. Therefore, the physical position of sectors mapped to the target LBAs may serve to indicate whether the data is likely to be metadata.

By applying one or more rules based on considerations such as one or more of the metadata identification factors 210, the storage device determines whether the host command 202 includes metadata. If the storage device controller determines that the data received with the host write command does not include metadata, the storage device controller caches the data in a volatile write cache and manages the cached data according to a first default write caching policy 206. If, however, the storage device controller determines that the data received with the host write command does include metadata, the storage device controller implements a metadata-specific caching policy 208. According to one implementation, the metadata-specific caching policy prioritizes the identified metadata for a flush out of the write cache and into permanent non-volatile storage locations. For example, the storage device controller queues up the flush command responsive to identifying the data as including metadata.

In general, FIG. 3-6 illustrate exemplary logic that may be performed by a storage device to identify one or more incoming write commands as metadata.

Figure 3:
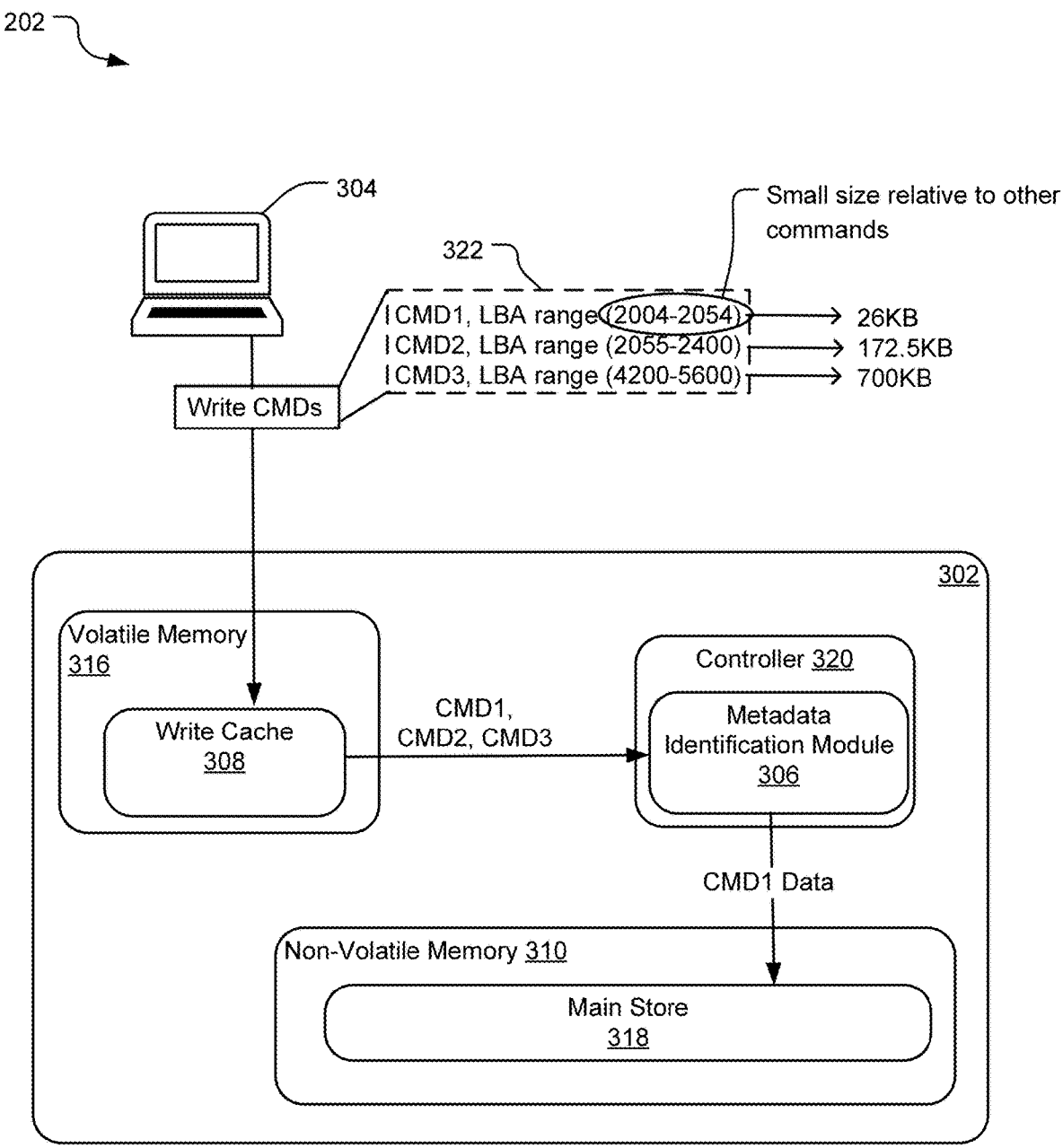
FIG. 3 illustrates an example system that selectively implements a metadata-specific caching policy.

FIG. 3 illustrates an example system 300 that implements two caching policies including (1) a metadata-specific caching policy for identified metadata; and (2) a default caching policy for all other received data excluding metadata.

In one implementation, the default caching policy provides caching rules for retaining command data in a write cache 308 of volatile memory 316 until the cached satisfies a cache coalescence condition. For example, the default caching policy may retain command data in the write cache for a period of time until the accumulated cache data includes a threshold quantity of LBA-consecutive data or until unused storage capacity in the write cache 308 decreases below some threshold. In either of these example scenarios, LBA-consecutive data may coalesce within the write cache 308 for a period of time before the storage device 320 queues a flush command that, when subsequently executed, migrates the coalesced data to disk.

In contrast to the default caching policy, the metadata-specific caching policy is a policy that prioritizes a quicker transfer of the command data from the write cache 308 to a permanent location within a region of a main store 318 of non-volatile memory 310. For example, the metadata-specific caching policy may provide for scheduling a flush of the command data (e.g., adding a flush command to a queue) for transferring identified metadata to a permanent non-volatile storage location without waiting for additional data to accumulate and without waiting for the aggregated cache data to satisfy a flush trigger condition.

A controller 320 of the storage device 302 includes a metadata identification module 306. In one implementation, the controller 320 and the metadata identification module 306 are locally stored and executed within the storage device 302.

A host device 304 transmits a series of write commands 322 to the storage device 302. As the storage device 302 receives these commands, the controller 320 writes the data associated with each command to the write cache 308. While this data resides in the write cache 308, the metadata identification module 306 evaluates each command individually and/or relative to the other commands in the series to determine whether the associated cached data includes metadata.

In FIG. 3, three example write commands are shown (CMD1, CMD2, CMD3). The metadata identification module 306 evaluates each command in view of predefined metadata indicator criteria. In the illustrated implementation, the predefined metadata indicator criteria is satisfied when a write size of the write command is consistent with a defined size constraint. In one implementation, the metadata identification module 306 determines that the command data is metadata when the write size is smaller than a set threshold. In the same or another implementation, the metadata identification module 306 determines that the command data is metadata when a data size of a host write command satisfies a defined ratio when compared to a data size of other recently-received write commands. For example, the data size of command 1 is less than ¼ of the average data size of a received host write command.

In FIG. 3, the first command (CMD1) specifies a write address range spanning 52 LBAs, which translates to 26 KB in a system that allocates 0.5 KB per data sector. The second command (CMD2) specifies a write of 172.5 KB of data while the third write command (CMD3) specifies a write of 700 KB of data. The metadata identification module determines that the data size of CMD1 satisfies the predefined metadata indicator criteria. Consequently, command data of CMD1 is identified as metadata, while command data of CMD1 and CMD3 is identified as video data.

Responsive to the identification of CMD1 as an instruction to write metadata, the controller 320 applies the metadata-specific caching policy to the 26 KB of command data received in association with CMD1 while applying the default caching policy to the 172.5 KB and 700 KB of data received in association with CMDs 2 and 3, respectively. Other aspects of the system 300 not explicitly described above may be the same or similar to those described elsewhere with respect to other implementations.

Figure 4:
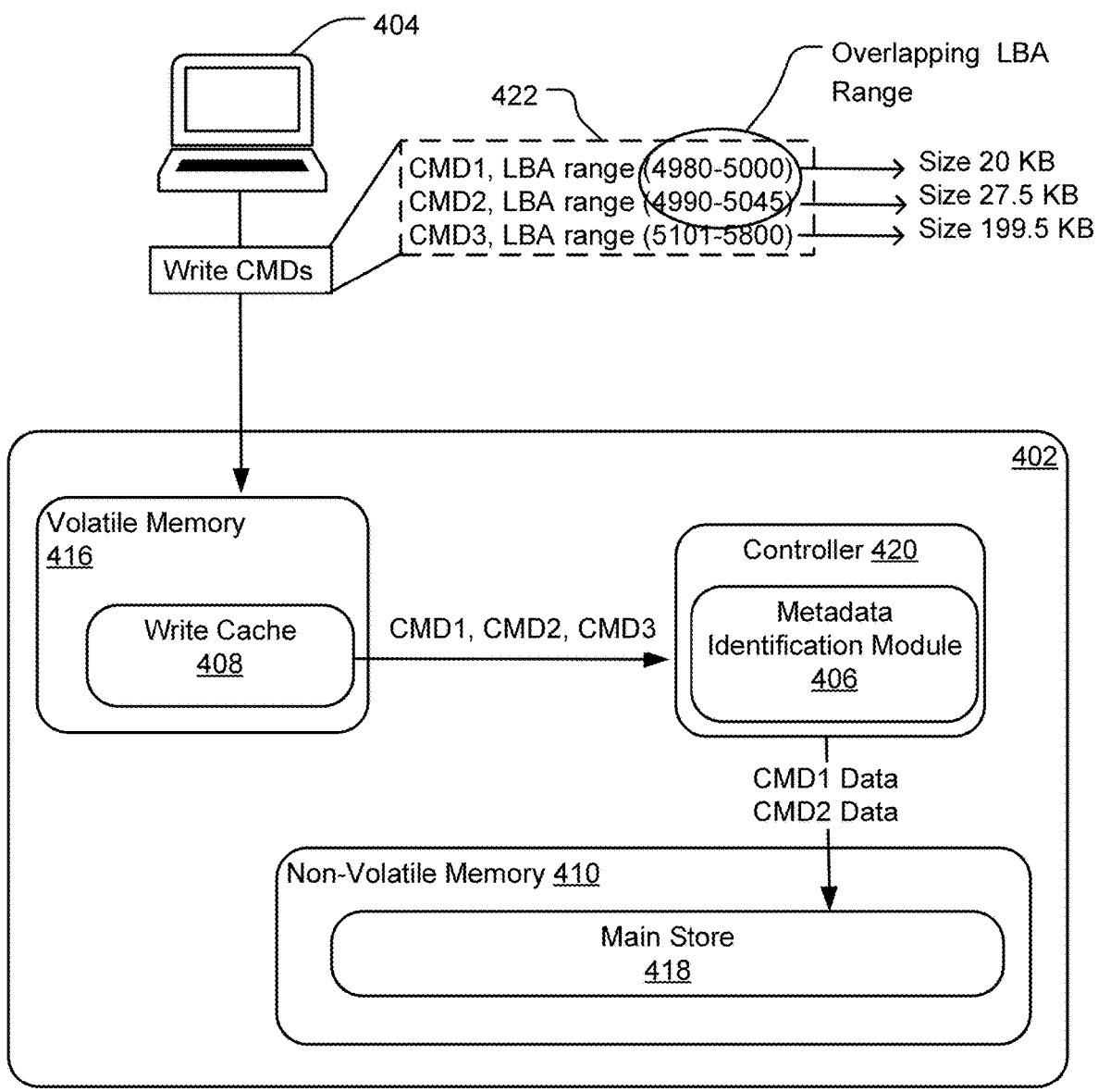
FIG. 4 illustrates another example system that selectively implements a metadata-specific caching policy.

FIG. 4 illustrates another example system 400 that selectively implements a metadata-specific caching policy for identified metadata and a default caching policy for other data that is not identified as metadata. In one implementation, the default caching policy and metadata-specific policy may be the same or similar to those described herein with respect to other implementations.

A host device 404 transmits a series of write commands 422 (e.g., CMD1, CMD2, CMD3) to the storage device 402. As the storage device 402 receives these write commands, a controller 420 writes command data of each received command to a write cache 408 in volatile memory 410 of the storage device 402. While this data resides within the write cache 408, metadata identification module 406 evaluates each command in view of predefined metadata indicator criteria.

In the illustrated implementation, the predefined metadata indicator criteria is satisfied when an incoming write command satisfies multiple metadata indicator conditions. For example, one metadata indicator condition is satisfied when the write data size is consistent with a defined size constraint. In contrast to the system of FIG. 3, however, the metadata identification module 406 implements logic under which write size is—alone—non-deterministic with respect to whether or not the command data includes metadata. For this reason, the metadata identification module 406 assesses satisfaction of one or more additional metadata indicator conditions.

In the example of FIG. 4, the metadata identification module 406 determines that CMD1 and CMD2 are directed to LBA ranges that partially overlap with one another (e.g., 4980-5000 and 4990-5045). This overlap (a first metadata indicator), in combination with the small data size of CMD1 and CMD2 (a second metadata indicator), satisfies the metadata identification criteria, and the metadata identification module 406 identifies CMD1 and CMD2 as metadata.

Although CMD1 and CMD2 are shown to be sequentially-received, there may exist scenarios where partial LBA overlap is detected between two commands that are not sequentially received. Partial LBA range overlap between non-sequential commands may also be a metadata indicator provided that these commands are received within some defined time interval of one another (e.g., within a threshold time-out period, such as 5 minutes).

Responsive to the identification of the command data of CMD1 and CMD2 as including metadata, the controller 420 applies the metadata-specific caching policy to command data of CMD 1 and 2. According to one implementation, the metadata-specific caching policy prioritizes a flush of the associated command data to permanent locations within a main store 418 of non-volatile memory 410. The command data of CMD3 is, in contrast, is cached and managed according to a different caching policy, such as one that allows greater amounts of data to accumulate and coalesce within the write cache 408. Other aspects of the system 400 not explicitly described herein may be the same or similar to those described elsewhere with respect to other implementations.

Figure 5:
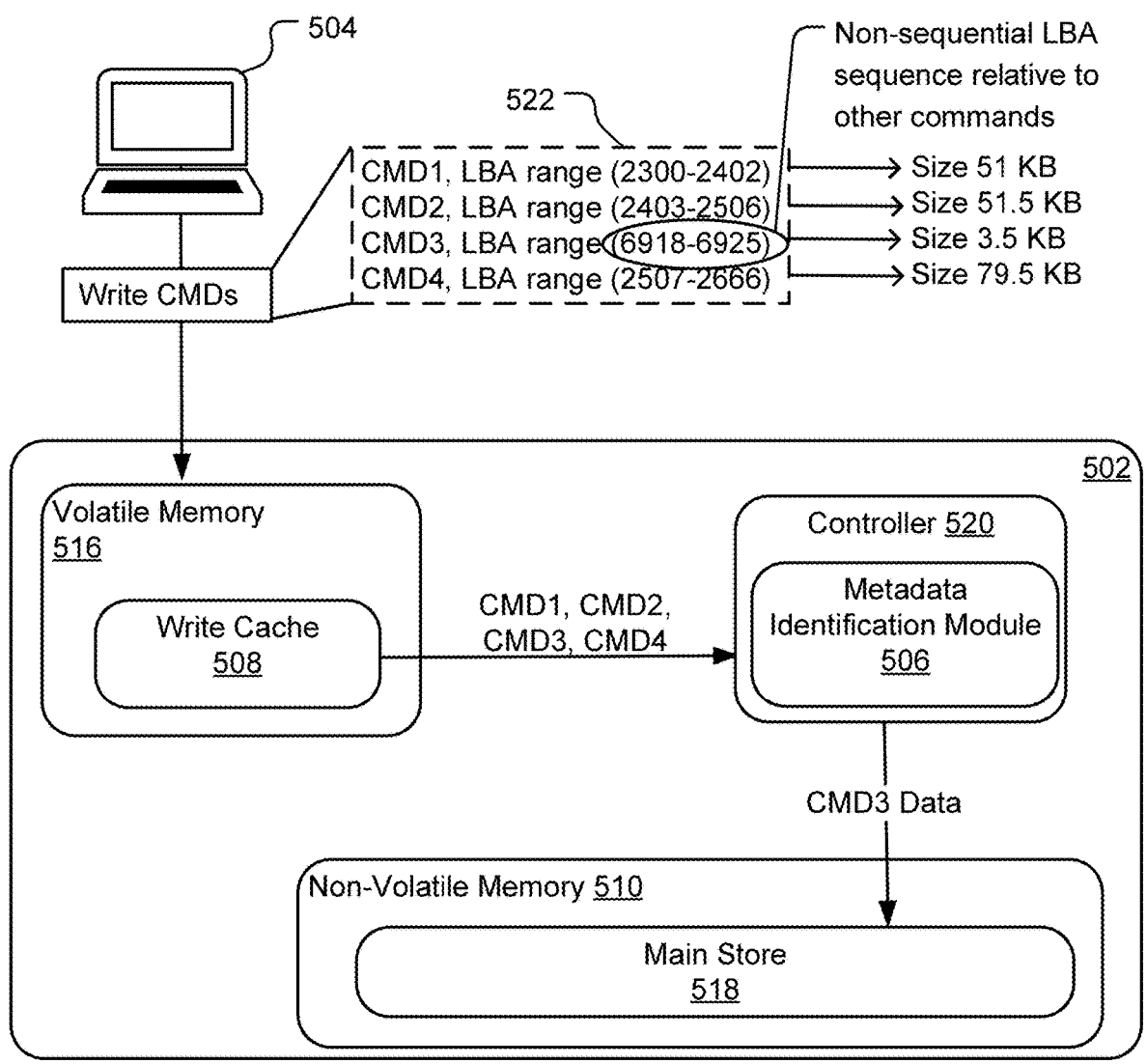
FIG. 5 illustrates yet another example system that selectively implements a metadata-specific caching policy.

FIG. 5 illustrates another example system 500 that selectively implements a metadata-specific caching policy for identified metadata and a default caching policy for other types of data. The default caching policy and metadata-specific policy may be the same or similar to those described herein with respect to other implementations.

A host device 504 transmits a series of write commands 522 (e.g., CMD1, CMD2, CMD3, CMD4) to a storage device 502. As the storage device 502 receives these write commands, a controller 520 writes command data of each received command to a write cache 508 in volatile memory 510. While this data resides within the write cache 508, a metadata identification module 506 evaluates each write command with respect to defined metadata indicator criteria to determine whether or not the associated command data includes metadata.

In the illustrated implementation, the predefined metadata indicator criteria is satisfied when an incoming write command satisfies multiple metadata indicator conditions. In FIG. 5, the metadata identification module 506 detects that three of the four sequentially-received write commands have a write data size that is within a size range consistent of that expected for metadata (e.g., less than 64 KB). This data size satisfies a first metadata indicator condition with respect to CMDS 1, 2, and 3. The metadata identification module 606 also determines that the target LBA ranges of CMD1, CMD2, and CMD4 are sequential with one another while the target LBA range of CMD3 is non-sequential relative to the other three commands in this sequence. The out-of-sequence LBA range of CMD 3 satisfies a second metadata indicator condition.

Based on this assessment of data size and target LBA sequence, the metadata identification module 506 determines that the command data of CMD3 includes metadata while the command data of CMD1, CMD2, and CMD4 does not include metadata. Responsive to the identification of CMD3 as being a write of metadata, the controller 520 applies the metadata-specific caching policy to the command data of CMD3, thereby prioritizing a flush of the command data of this command to permanent locations within the main store 518 of non-volatile memory 510. The command data of CMD1, CMD2, and CMD4 is, in contrast, cached and managed according to a different caching policy. Other aspects of the system 500 not explicitly described herein may be the same or similar to those described elsewhere with respect to other implementations.

Figure 6:
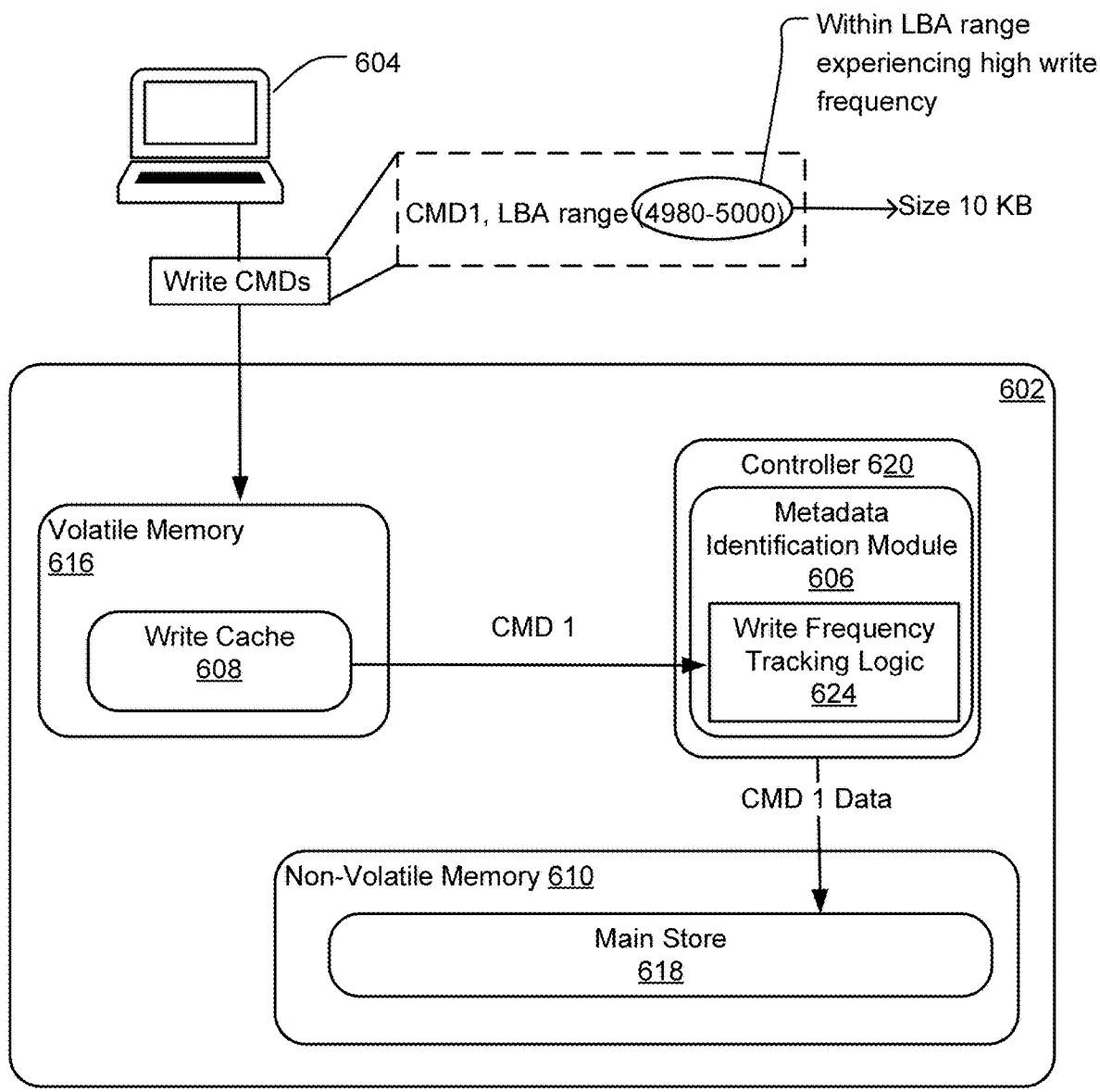
FIG. 6 illustrates another example system that selectively implements a metadata-specific caching policy

FIG. 6 illustrates another example system 600 that selectively implements a metadata-specific caching policy for identified metadata and a default caching policy for other types of data. In one implementation, the default caching policy and metadata-specific policy are the same or similar as the other like-name caching policies described herein.

A host device 604 transmits an example write command 622 to a storage device 602. Although the write command 622 is shown in isolation, this command may be received in sequence with several other write commands. A controller 620 writes command data of the write command 622 to a write cache 608 in volatile memory 616. While this data resides within the write cache 608, a metadata identification module 606 evaluates the write command 622 with respect to predefined metadata indicator criteria to determine whether or not the associated command data includes metadata.

In FIG. 6, the predefined metadata indicator criteria are satisfied when an incoming write command satisfies one or more predefined combinations of metadata indicator conditions. The metadata identification module 606 determines that the write command 622 is of a size that is consistent with an expected size of metadata (e.g., less than 64 KB). This determination satisfies a first metadata indicator condition.

By executing write frequency tracking logic 624, thee metadata identification module 606 also determines that the target LBA range of the write command 622 (e.g., LBAs 4980-5000) has been recently been updated a number of times satisfying a threshold. For example, the target LBA range of the write command 622 has been updated a set number (e.g., 15 times) within a recent time period, such as five minutes. The high-activity write history for this target LBA region satisfies a second metadata indicator condition.

Based on this assessment of write data size and LBA write frequency, the metadata identification module 606 determines that the write data of the write command 622 includes metadata. The controller 620 applies the metadata-specific caching policy to the command data of the write command 622, thereby prioritizing a flush of this command data to a permanent storage location within a main store 618 within non-volatile memory 610. Other aspects of the system 600 not explicitly described herein may be the same or similar to those described elsewhere with respect to other implementations.

In still another implementation not illustrated in FIGS. 3-6, satisfaction of the predefined metadata indicator criteria may depend on the target physical location of incoming command data. For example, data directed to LBAs mapped to extreme inner diameter or outer diameter positions on a disk may be more likely to be metadata than data that is directed to other physical storage locations.

Notably, some implementations of the disclosed technology may be based the above-described metadata assessment on the assessment of a single metadata indicator condition or combinations of metadata indicator conditions, including conditions and combinations of conditions different than those described herein. For instance, this determination may not always be contingent on data size of each write command.

In accordance with various embodiments, the methods and systems described herein may be implemented as one or more software programs running on a computer processor or controller device. In accordance with other embodiments, the methods and software described herein may be implemented as one or more software programs running on a computing device, such as a personal computer that is using a data storage device such as a disc drive. Further, the methods described herein may be implemented as a computer-readable data storage medium or memory device storing instructions that when executed cause a processor to perform the methods.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules.

The illustrations of certain embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Furthermore, it should be understood that logical operations may be performed in any order, adding and omitting as desired, unless explicitly claimed otherwise or a specific order is inherently necessitated by the claim language.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
    writing command data to a volatile write cache responsive to receipt of a write command;
    evaluating the write command to determine whether the command data includes metadata;
    flushing the command data out of the volatile write cache according to a first caching policy responsive to a determination that the command data includes metadata; and
    flushing the command data out of the volatile write cache according to a second different caching policy responsive to a determination that the command data does not include metadata, the first caching policy prioritizing the flush of the command data at an earlier time than the second different caching policy.

2. The method of claim 1, further comprising:
    determining that the write command satisfies one or more metadata indicator criteria; and
    flushing the command data out of the volatile write cache according to the first caching policy responsive to the determination.

3. The method of claim 2, wherein the metadata indicator criteria includes a criterion satisfied when a data size of the command data is consistent with an expected size of a metadata update.

4. The method of claim 2, wherein the metadata indicator criteria includes a criterion satisfied when a target logical block address (LBA) range of the write command partially overlaps with a LBA-range of a previously-executed write command.

5. The method of claim 2, wherein the metadata indicator criteria includes a criterion satisfied when a target LBA range of the write command has been written to according to a write frequency in excess of a defined threshold.

6. The method of claim 2, wherein the metadata indicator criteria includes a criterion satisfied when estimated write throughput of the write command exceeds a defined threshold.

7. The method of claim 2, wherein the metadata indicator criteria includes a criterion satisfied when the write command targets physical data blocks located proximal to either an outer diameter or an inner diameter of a disk.

8. The method of claim 1, wherein the second different caching policy retains the command data in the volatile write cache until a cache coalescence condition is satisfied by data residing the volatile write cache.

9. The method of claim 1, wherein the first caching policy adds a flush command to a command queue, the flush command being executable to flush the command data out of the volatile write cache without first coalescing the command data with other cache data.

10. A system comprising:
    a storage device controller stored in memory and executable to:
    write command data to a volatile write cache responsive to receipt of a write command;
    evaluate the write command to determine whether the command data includes metadata;
    flush the command data out of the volatile write cache according to a first caching policy responsive to a determination that the command data includes metadata; and
    flush the command data out of the volatile write cache according to a second different caching policy responsive to a determination that the command data does not include metadata, the first caching policy prioritizing the flush of the command data at an earlier time than the second different caching policy.

11. The system of claim 10, wherein the storage device controller is further executable to:
    determine that the write command satisfies one or more metadata indicator criteria; and
    flush the command data out of the volatile write cache according to the first caching policy responsive to the determination.

12. The system of claim 11, wherein the metadata indicator criteria includes a criterion satisfied when a data size of the command data is consistent with an expected size of a metadata update.

13. The system of claim 11, wherein the metadata indicator criteria includes a criterion satisfied when a target logical block address (LBA) range of the write command partially overlaps with a LBA-range of a previously-executed write command.

14. The system of claim 11 wherein the metadata indicator criteria includes a criterion satisfied when a target LBA range of the write command has been written to according to a write frequency in excess of a defined threshold.

15. The system of claim 11, wherein the metadata indicator criteria includes a criterion satisfied when estimated write throughput of the write command exceeds a defined threshold.

16. The system of claim 11, wherein the metadata indicator criteria includes a criterion satisfied when the write command targets physical data blocks located proximal to either an outer diameter or an inner diameter of a disk.

17. The system of claim 10, wherein the first caching policy adds a flush command to a command queue, the flush command being executable to flush the command data out of the volatile write cache without first coalescing the command data with other cache data.

18. The system of claim 10, wherein the second different caching policy retains the command data in the volatile write cache until a cache coalescence condition is satisfied by data residing in the volatile write cache.

19. One or more memory devices encoding computer-executable instructions for executing on a computer system a computer process comprising:
    writing command data to a volatile write cache responsive to receipt of a write command;

evaluating the write command to determine whether the command data includes metadata;

flushing the command data out of the volatile write cache according to a first caching policy responsive to a determination that the command data includes metadata; and flushing the command data out of the volatile write cache according to a second different caching policy responsive to a determination that the command data does not include metadata, the first caching policy prioritizing the flush of the command data at an earlier time than the second different caching policy.

20. The one or more memory devices of claim 19, wherein the first caching policy adds a flush command to a command queue, the flush command being executable to flush the command data out of the volatile write cache without first coalescing the command data with other cache data.

* * * * *